United States Patent [19]

Mizutani et al.

[11] Patent Number: 4,743,667

[45] Date of Patent: * May 10, 1988

[54] CONTACT LENS MATERIAL

[75] Inventors: Yutaka Mizutani; Tatsuo Harata, both of Nagoya; Naokatsu Tanahashi, Gifu, all of Japan

[73] Assignee: Nippon Contact Lens, Inc., Japan

[*] Notice: The portion of the term of this patent subsequent to Jul. 22, 2003 has been disclaimed.

[21] Appl. No.: 888,924

[22] Filed: Jul. 22, 1986

[30] Foreign Application Priority Data

Sep. 3, 1985 [JP] Japan .................................. 60-193139

[51] Int. Cl.$^4$ .......................... C08F 20/22; C08F 30/08
[52] U.S. Cl. .................................... 526/245; 526/263; 526/279
[58] Field of Search ............... 526/225, 263, 245, 279; 523/167

[56] References Cited

U.S. PATENT DOCUMENTS

| | | | |
|---|---|---|---|
| 4,508,884 | 4/1985 | Wittmann et al. ................... | 526/279 |
| 4,525,563 | 6/1985 | Shibato et al. ........................ | 526/279 |
| 4,602,074 | 7/1986 | Mizutani et al. ..................... | 526/279 |

Primary Examiner—Joseph L. Schofer
Assistant Examiner—Peter F. Kulkosky
Attorney, Agent, or Firm—Wyatt, Gerber, Shoup & Badie

[57] ABSTRACT

The invention relates to novel multifunctional organosiloxane monomers which can be represented by the general formulas:

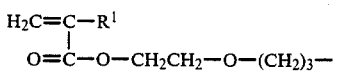

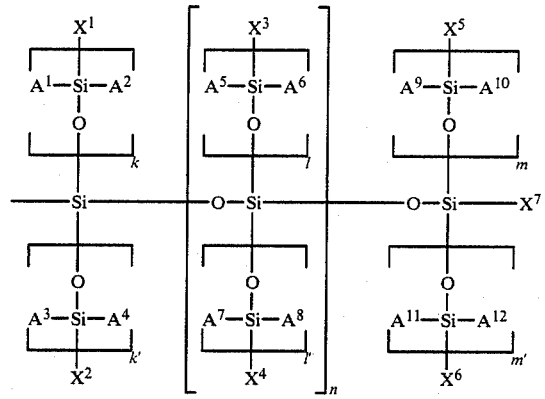

and

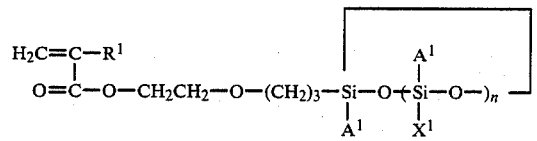

wherein, at least one of "$X^1$"–"$X^7$" is a group of the following structure:

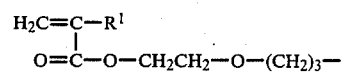

and its copolymerization with monofunctional organosiloxane monomers which can be represented by the general formulas:

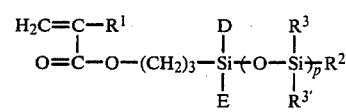

and

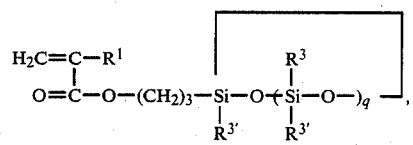

and alkyl and/or cyclic alkyl esters of acrylic, methacrylic acids and/or itaconate esters, and in some cases fluoroalkyl esters of acrylic, methacrylic acids and/or fluoroalkyl itaconate esters to produce excellent oxygen permeable hard contact lens material.

Preferably, the copolymer includes cross-linking agents and wetting agents.

Contact lenses manufactured from the materials can be easily machined and polished into hard contact lenses having solvent-resistance and sufficient permeabilities.

9 Claims, No Drawings

CONTACT LENS MATERIAL

BACKGROUND OF THE INVENTION (1) Field of the Invention

The present invention relates to an oxygen-permeable, machinable, dimensionally stable, wettable, solvent-resistant, hard contact lens material consisting of a polymer formed by free radical polymerization to provide extended duration wearing capabilities.

(2) Description of the Prior Art

The prior art teaches the use of many different polymeric materials in contact lenses.

Poly-methylmethacrylate is highly advantageous in its excellent optical properties and durability, but it is relatively impermeable to oxygen.

The hydrogel materials consisting of polymers of 2-hydroxy ethyl methacrylate or N-vinyl-2-pyrrolidone are soft and have good wettability, but they have extremely poor mechanical strength, so that they are less durable and extremely difficult to handle. In addition, they provide an environment which is favorable for bacterial growth.

Silicone rubber is soft, resilient and highly permeable to oxygen, however this material is hydrophobic.

In the last few years, considerable attention has been directed to obtaining oxygen permeable polymer compositions which are suitable for fabricating hard contact lenses.

The prior art known to us consists of the copolymers and articles of manufacture described in U.S. Pat. No. 3,808,178 to Gaylord. The copolymers described in the Gaylord patent are copolymers of polysiloxanyl acrylic esters and an alkyl acrylic ester. Gaylord also discloses that other comonomers can be employed to improve certain physical properties of his copolymers, such as acrylic or methacrylic acid to improve the wettability of the copolymer, and ethylene glycol dimethacrylate to improve the rigidity of the copolymer.

Tanaka, et al., U.S. Pat. No. 4,139,692 and Ichinohe, et al., U.S. Pat. No. 4,433,125 disclose soft contact lenses composed of hydrophilic moiety and polysiloxanyl propyl glycerol acrylate monomer having in one mole at least one group of the general formula:

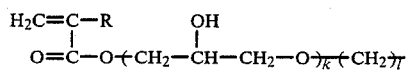

The compounds of Tanaka and Ichinohe are practically identical to each other. The lenses formed from them are said to lie intermediate silicone rubber and conventional hydrophilic contact lenses in wettability and oxygen permeability, as shown in the U.S. Pat. No. 4,507,452.

Their monomers include in a molecule, a large group such as

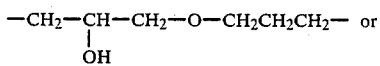

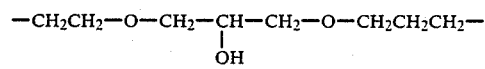

and its copolymers are liable to become soft. The larger amount of their monomer in a copolymer proportion increases to improve the oxygen permeability of the copolymer, the softer the copolymer becomes.

All of their monomers differ from the instant monomers in that their monomers are substituted on the alkylene chain with an hydroxyl substituent. There is no such substituent in instant monomers. Moreover, the carbon chain carrying the hydroxyl group in their monomers is three carbon atoms in length. In instant monomers it is only two carbon atoms in length.

Therefore, "4,139,692" and "4,433,125" do not teach the instant monomers much less the instant copolymers.

Deichert, et al., U.S. Pat. No. 4,153,641 disclose polysiloxane based polymers which are end capped with unsaturated groups which have polymerizable double or triple bond such as 2-cyanoacryloxy, acrylonitryl, acrylamide, acryloxy, methacryloxy, styryl, N-vinyl-2-pyrrolidone-3-yl, N-vinyl-2-pyrrolidone-4-yl and N-vinyl-2-pyrrolidone-5-yl. The Deichert poly(organosiloxane) monomer has the formula:

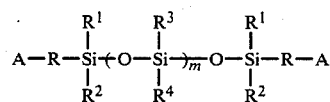

wherein A is an activated unsaturated group, R is a divalent hydrocarbon radical, $R^1$, $R^2$, $R^3$ and $R^4$ are selected from the group consisting of a monovalent hydrocarbon radical or halogen substituted monovalent hydrocarbon radical, and m is 50 or greater.

The lenses made from his copolymers are soft contact lenses having a Shore hardness of 60 or below on the Shore hardness scale A.

U.S. Pat. No. 4,153,641 dose not teach the instant organolsiloxane monomers much less the instant copolymers.

Friends, U.S. Pat. No. 4,254,248 discloses monomeric polysiloxanes with a comonomer comprising a polycyclic ester of acrylic acid or methacrylic acid to form a soft contact lens having a Shore hardness of 60 or below on the Shore hardness scale A.

Therefore, the instant organosiloxane monomers and the instant copolymers are not taught in this article.

Ellis, U.S. Pat. No. 4,424,328 discloses hard contact lenses formed of unsaturated, multifunctional organosiloxane alone or mixed with monofunctional organosiloxane and alkyl acrylate and alkyl itaconate.

Ellis monomer has the formula:

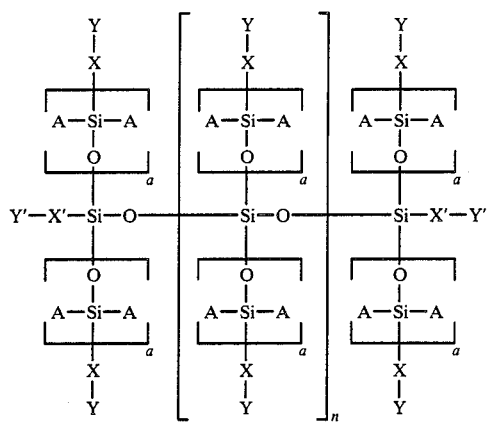

wherein Y' is an unsaturated polymerizable group, X' is a divalent hydrocarbon having from 0 to 10 carbons, Y is an unsaturated polymerizable group, X is a divalent hydrocarbon, A is selected from the group consisting of straight chain alkyl groups having 1 to 5 carbon atoms branched chain, or cyclic alkyl groups having 3 to 5 carbon atoms, phenyl groups and "Z" groups, "Z" is a group selected from the class consisting of trimethyl siloxy, pentamethyl disiloxanyl, heptamethyl trisiloxanyl, etc., "a" is an integer from 0 to 10, the total of "a" values is at least 2, "n" is an integer from 0 to 10, and each of said X, X', Y, Y', a, A and Z groups each individually being the same or different.

Foley, U.S. Pat. No. 4,507,452 discloses multifunctional silicon hydride comonomer which has the structural formula

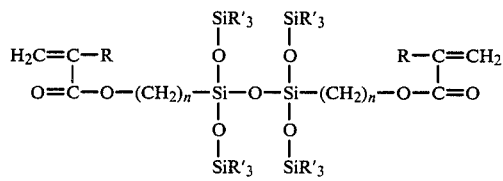

wherein n is a positive integer from 1 to 6, R is hydrogen, methyl or ethyl radical, and R' is hydrogen, or a monovalent hydrocarbon radical free of aliphatic unsaturation, typically methyl, ethyl or phenyl radicals, including substituted phenyl radicals, at least one R' being hydrogen radical.

His monomer is also generally similar to the Ellis monomer but having a silicon hydride group in a molecule.

There is neither disclosure nor suggestion of instant organosiloxane monomers having in a molecule at least one group of the structural formula

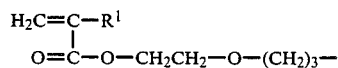

wherein R1 is hydrogen or methyl radical, in the Ellis patent and the Foley patent.

Generally, copolymers formed from monomers containing siloxane bond are hydrophobic, and such copolymers can not be employed as materials of contact lens unless the monomers are copolymerized with wetting agents such as methacrylic acid. However, the copolymers formed by copolymerization of organosiloxane monomers and wetting agents are liable to become opaque. This is a fatal defect in use as a material of contact lens. Therefore, the proportion of organosiloxane monomers to wetting agents is limited for producing transparent copolymer. It is necessary to increase the amount of the organosiloxane monomers for obtaining the oxygen permeability enough to make the extended duration wearing capabilities. However, the more the amount of the organosiloxane monomers increases, the more hydrophobic the copolymers become. For this reason, a larger amount of the wetting agents must be copolymerized. When a large amount of the wetting agents is employed, the produced copolymer becomes opaque. In order to form a transparent copolymer, the amount of organosiloxane monomers and/or wetting agents must be decreased, and a copolymer having sufficient oxygen permeability, good wettability and transparency can not be obtained.

In contrast, instant organosiloxane monomers have one ether bond in a molecule and therefore, are miscible with wetting agents in all proportions and also a transparent copolymer can be obtained by copolymerization with a large amount of instant organosiloxane monomers and a large amount of wetting agents. The instant copolymers are colorless, transparent and hydrophilic, and have sufficient oxygen permeability.

DESCRIPTION OF THE INVENTION

It is an object of the present invention to provide a hard contact lens material having high oxygen permeability.

It is another object of the present invention to provide a hard contact lens material improved oxygen permeability, solvent-resistance and dimensional stability.

The copolymer used to fabricate the contact lens which employed in this invention is prepared by copolymerizing at least one multifunctional organosiloxane monomer with monofunctional organosiloxane monomer and alkyl and/or cyclic alkyl esters of acrylic, methacrylic acids and/or itaconate esters, and in some cases fluoroalkyl esters of acrylic, methacrylic acids and/or fluoroalkyl itaconate esters.

Preferably, the copolymer includes cross-linking agents and wetting agents, further includes fluoroalkyl benzyl ester or fluoro cumyl ester monomer which give increased rigidity and hardness. In the present polymer system, fluoroalkyl benzyl ester and fluoro cumyl ester monomer have been found to uniquely function to give increased rigidity and hardness with oxygen-permeability retention characteristics.

It is a feature of this invention that contact lenses made from the materials of this invention are preferably hard, high oxygen-permeable contact lenses having good dimensional stability, high transparency and good wettability. Because of the multifunctional organosiloxane monomer having two ether bonds in a molecule and fluoro monomer having a phenyl group used, they have good wettability, solvent resistance high impact strength and reduced brittleness. It is concluded that a larger degree of cross-linkage is formed when polymerizing multifunctional organosiloxane monomer, and the final products have larger density of cross-linkage than would be the case with monofunctional organosiloxane monomer, and crystalline structure formed by phenyl groups included in the fluoroalkyl benzyl or fluoro cumyl ester monomer would increase.

Ordinarily, on the final stage of the lens manufacturing procces, the lenses should have a ultrasonic cleaning using n-hexane or industrial grade solvent, to remove the waxy component of the blocking wax and small bits of the blocking wax, itself. However, the lenses which have bad solvent resistance are softened and the lenses are discolored by these solvents. The contact lens made from the instant polymer has good solvent resistance for a larger degree of crosslinkage in instant polymer.

Preferred multifunctional organosiloxane monomers of the present invention may be represented by the formulas:

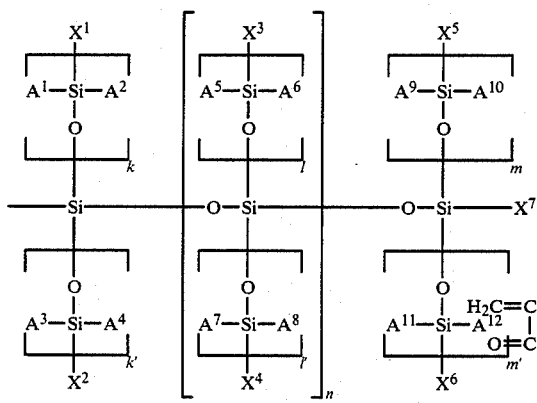

and

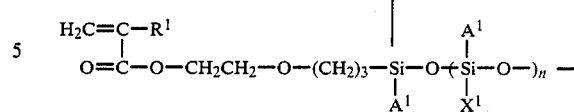

wherein "$X^1$"–"$X^7$" are selected from the class consisting of $C_1$–$C_6$ alkyl groups, cyclic alkyl groups, phenyl groups and "Y" groups, at least one of "$X^1$"–"$X^7$" being "Y" group; "Y" is a group of the following structure:

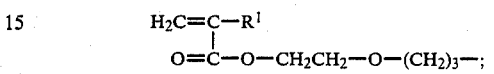

"$R^1$" is hydrogen or methyl radical; "$A^1$"–"$A^{12}$" are selected from the class consisting of $C_1$–$C_6$ alkyl groups, cyclic alkyl groups, phenyl groups and "Z" groups; "Z" is a group of the following structure:

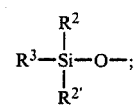

"$R^2$", "$R^{2'}$" and "$R^3$" are selected from the class consisting of $C_1$–$C_6$ alkyl groups, cyclic alkyl groups and phenyl groups; "k", "k'", "l", "l'", "m", "m'" and n are integers from 0 to 10.

Representative multifunctional organosiloxane monomers include following;

1,3-bis(methacryloxyethoxypropyl)-1,1,3,3-tetramethyldisiloxane

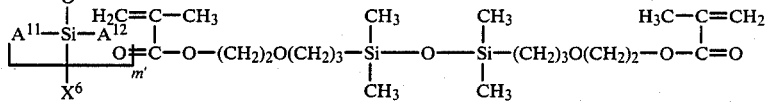

1,3-bis(methacryloxyethoxypropyl)-1,1-bis(trimethylsiloxy)-3,3-dimethyldisiloxane

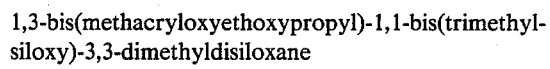

1,3-bis(methacryloxyethoxypropyl-1,1,3,3-tetrakis(-trimethylsiloxy)disiloxane

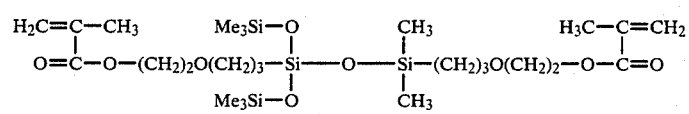

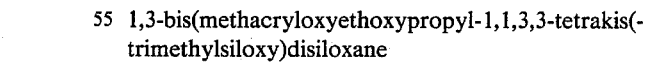

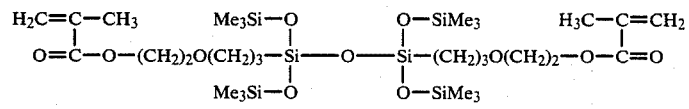

1,7-bis(methacryloxyethoxypropyl)-1,1,7,7-tetrakis(-trimethylsiloxy)-3,3,5,5,-tetramethyltetrasiloxane 1,3-bis(acryloxyethoxypropyl)-1,1,3,3-tetraphenyldisiloxane

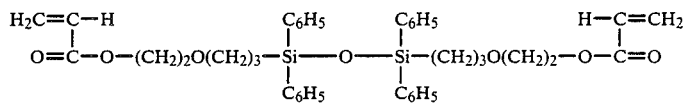

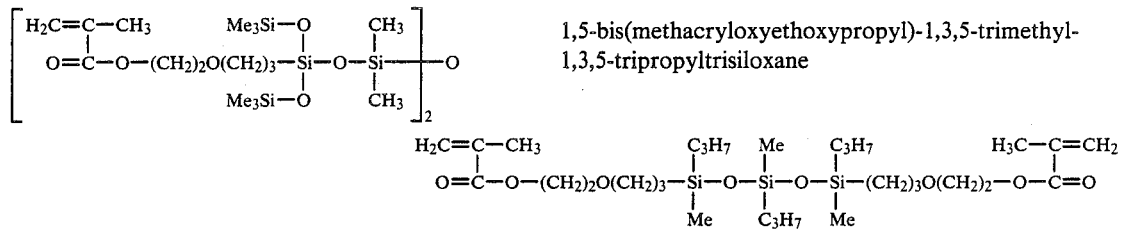

1,5-bis(methacryloxyethoxypropyl)-1,3,5-trimethyl-1,3,5-tripropyltrisiloxane

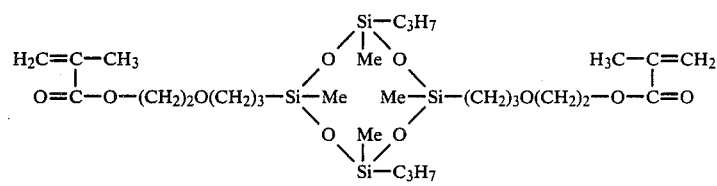

1,5-bis(methacryloxyethoxypropyl)-1,3,5,7-tetramethyl-3,7-dipropylcyclotetrasiloxane

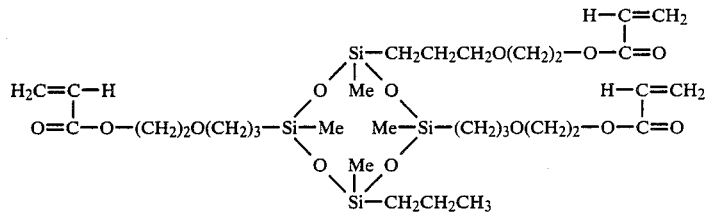

1,5-bis(acryloxyethoxypropyl)-1,1,3,3,5,5-hexamethyl- 1,3,5-tris(acryloxyethoxypropyl)-1,3,5,7-tetramethyl-7-propylcyclotetrasiloxane trisiloxane 1,3,5,7-tetrakis(methacryloxyethoxypropyl)-1,3,5,7-tetramethylcyclotetrasiloxane

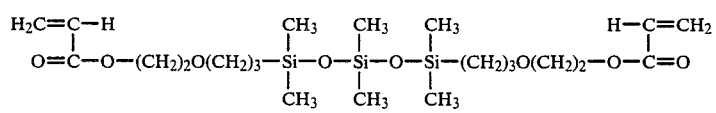

1,3-bis(methacryloxyethoxypropyl)-1,1,3,3-tetrakis(bis(trimethylsiloxy)methylsiloxy)disiloxane

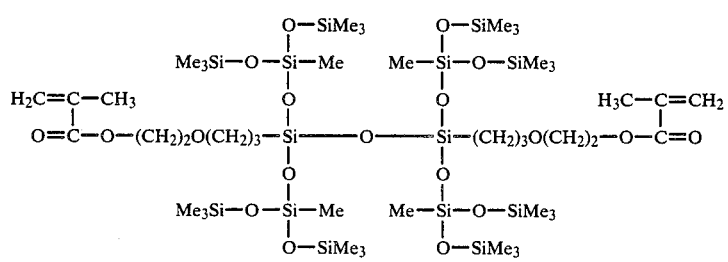

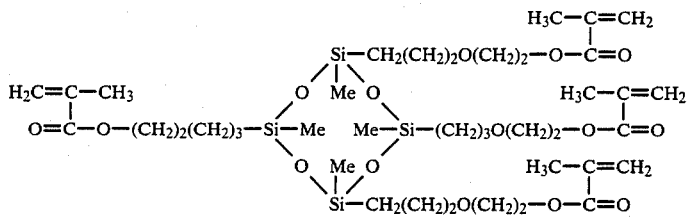

tris(acryloxyethoxypropyl dimethylsiloxy)methylsilane methacryloxypropyl-3-phenyl-1,1,3,3-tetramethyldisiloxane,

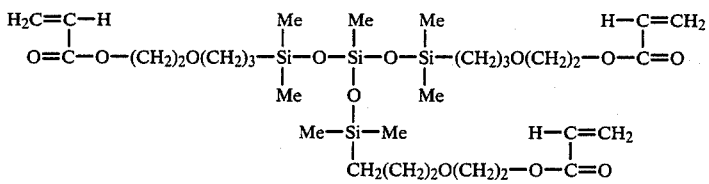

Preferably the organosiloxane monomers used to form the contact lens can be not only a multifunctional organosiloxane monomer, but also a combination of the above multifunctional organosiloxane monomers with monofunctional organosiloxane monomers having the following structures:

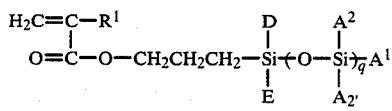

and

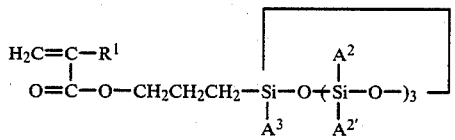

wherein "$R^1$" is hydrogen or methyl radical; "$A^1$", "$A^2$", "$A^{2'}$" and "$A^3$" are selected from the class consisting of $C_1$–$C_6$ alkyl groups and phenyl groups; "D" and "E" are selected from the class consisting of $C_1$–$C_6$ alkyl groups, phenyl groups and the following groups:

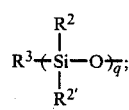

"$R^2$", "$R^{2'}$" and "$R^3$" are selected from the class consisting of $C_1$–$C_6$ alkyl groups and phenyl groups; "q" is an integer from 1 to 3.

Representative monofunctional organosiloxane monomers include following:
methacryloxypropyl pentamethyldisiloxane,
acryloxypropyl pentamethyldisiloxane,
methacryloxypropyl heptamethyltrisiloxane,
acryloxypropyl heptamethyltrisiloxane,
methacryloxypropyl tris(trimethylsiloxy)silane,
acryloxypropyl tris(trimethylsiloxy)silane,
acryloxypropyl-3-phenyl-1,1,3,3-tetramethyldisiloxane,
methacryloxypropyl-1,1,3,3,5,5-hexamethyl-5-pentyltrisiloxane,
acryloxypropyl-1,1,3,3,5,5-hexamethyl-5-pentyltrisiloxane,
methacryloxypropyl-1,1-dipropyl-3,3,5,5,5-pentamethyltrisiloxane,
acryloxypropyl-1,1-dipropyl-3,3,5,5,5-pentamethyltrisiloxane,
methacryloxypropyl-1,1,3,3,5,5,7,7-octamethyl-7-phenyltetrasiloxane,
acryloxypropyl-1,1,3,3,5,5,7,7-octamethyl-7-phenyltetrasiloxane,
methacryloxypropyl-3-isobutyl-1,1,3,3-tetramethyldisiloxane,
acryloxypropyl-3-isobutyl-1,1,3,3-tetramethyldisiloxane,
methacryloxypropyl bis(trimethylsiloxy)methylsilane,
acryloxypropyl bis(trimethylsiloxy)methylsilane,
methacryloxypropyl-1,1-bis(trimethylsiloxy)-3,3,5,5,5-pentamethyltrisiloxane,
acryloxypropyl-1,1-bis(trimethylsiloxy)-3,3,5,5,5-pentamethyltrisiloxane,
methacryloxypropyl heptamethylcyclotetrasiloxane,
acryloxypropyl heptamethylcyclotetrasiloxane,
methacryloxypropyl-1,3,5,7-tetramethyl-3,5,7-tripropylcyclotetrasiloxane,
acryloxypropyl-1,3,5,7-tetramethyl-3,5,7-tripropylcyclotetrasiloxane.

The $C_1$–$C_{10}$ alkyl, cyclic alkyl and phenyl esters of acrylic, methacrylic acids and itaconate esters, which are useful as comonomers in forming the copolymeer of the present invention include:
methyl acrylate and methacrylate,
mono- and dimethyl itaconate,
ethyl acrylate and methacrylate,
mono- and di-ethyl itaconate,
n-propyl acrylate and methacrylate,
mono- and di-n-propyl itaconate,
isopropyl acrylate and methacrylate,
mono- and di-isopropyl itaconate,
n-butyl acrylate and methacrylate,
mono- and di-n-butyl itaconate,
iso-butyl acrylate and methacrylate,
mono- and di-isobutyl itaconate, tert-butyl acrylate and methacrylate,
mono- and di-tert-butyl itaconate,
n-amyl acrylate and methacrylate,
mono- and di-n-amyl itaconate,
iso-amyl acrylate and methacrylate,
mono- and di-iso-amyl itaconate,
tert-amyl acrylate and methacrylate,
mono- and di-tert-amyl itaconate,
hexyl acrylate and methacrylate,
mono- and di-hexyl itaconate,
heptyl acrylate and methacrylate,
mono- and di-heptyl itaconate,
octyl acrylate and methacrylate,
mono- and di-octyl itaconate,
2-ethylhexyl acrylate and methacrylate,
mono- and di-2-ethylhexyl itaconate,
cyclohexyl acrylate and methacrylate,
mono- and di-cyclohexyl itaconate,
phenyl acrylate and methacrylate,
tert-butylphenyl acrylate and methacrylate,
mono- and di-tert-butylphenyl itaconate,
benzyl acrylate and methacrylate,
mono- and di-benzyl itaconate,
triphenylmethyl acrylate and methacrylate,
mono- and di-triphenyl itaconate.

The cross-linking agents include multifunctional compounds such as:
ethylene glycol diacrylate and dimethacrylate,
diethylene glycol diacrylate and dimethacrylate,
triethylene glycol diacrylate and dimethacrylate,
tetraethylene glycol diacrylate and dimethacrylate,
1,3-butanediol diacrylate and dimethacrylate,
1,4-butanediol diacrylate and dimethacrylate,
1,6-hexanediol diacrylate and dimethacrylate,
neopentyl glycol diacrylate and dimethacrylate,
trimethylol propane triacrylate and trimethacrylate,
pentaerythrytol tetraacrylate and tetramethacrylate,
diacryloxybenzophenone and dimethacryloxybenzophenone,
diacryloxy dimethoxy benzophenone and dimethacryloxy dimethoxy benzophenone.

The wetting agents include:
2-hydroxy ethyl acrylate and methacrylate,
2-hydroxy propyl acrylate and methacrylate,
2-hydroxy butyl acrylate and methacrylate,
diethylene glycol monoacrylate and monomethacrylate,
triethylene glycol monoacrylate and monomethacrylate,
acrylic acid, methacrylic acid, acrylamide, methacrylamide,
N-methylol methacrylamide, N-vinyl-2-pyrrolidone.

The fluoroalkyl esters of acrylic, methacrylic acids and fluoroalkyl itaconate esters can be represented by the formulas:

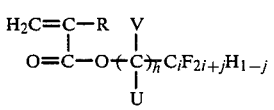

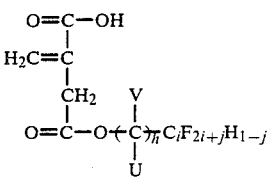

and

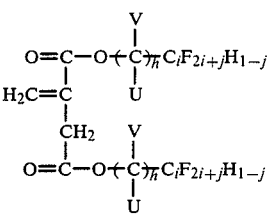

wherein "U" and "V" are selected from the class consisting of hydrogen and trifluoromethyl radical; "R" is hydrogen or methyl radical; "h" is 1 or 2; "i" is an integer from 1 to 10; "j" is 0 or 1.

Representative fluoroalkyl ester monomers include following:
2,2,2-trifluoroethyl acrylate and methacrylate,
mono- and bis-(2,2,2-trifluoroethyl)itaconate,
2,2,3,3-tetrafluoropropyl acrylate and methacrylate,
mono- and bis-(2,2,3,3-tetrafluoropropyl)itaconate,
2,2,3,3,4,4,5,5-octafluoropentyl acrylate and methacrylate,
mono- and bis-(2,2,3,3,4,4,5,5-octafluoropentyl)itaconate,
1H,1H,2H,2H-heptadecafluorodecyl acrylate and methacrylate,
mono- and bis-(1H,1H,2H,2H-heptadecafluorodecyl)itaconate,
1H,1H-pentadecafluorooctyl acrylate and methacrylate,
mono- and bis-(1H,1H-pentadecafluorooctyl)itaconate,
1H,1H-pentafluoropropyl acrylate and methacrylate,
mono- and bis-(1H,1H-pentafluoropropyl)itaconate,
hexafluoroisopropyl acrylate and methacrylate,
mono- and bis-(hexafluoroisopropyl)itaconate,
1H,1H-heptafluorobutyl acrylate and methacrylate,
mono- and bis-(heptafluorobutyl)itaconate.

Representative fluoro monomers having phenyl group include following
o-trifluoromethyl benzyl acrylate and methacrylate,
bis(o-trifluoromethyl benzyl)itaconate,
p-trifluoromethyl benzyl acrylate and methacrylate,
bis(p-trifluoromethyl benzyl)itaconate,
2,2,2,2',2',2'-hexafluoro cumyl acrylate and methacrylate,
bis(2,2,2,2',2',2'-hexafluoro cumyl)itaconate,
1,3-bis(2-acryloxy hexafluoro isopropyl)benzene,
1,3-bis(2-methacryloxy hexafluoro isopropyl)benzene.

The copolymers comprise 2–80 parts by weight of at least one multifunctional organosiloxane monomer copolymerized with 5 to 60 parts by weight of the monofunctional organosiloxane monomers, 0.5 to 95 parts by weight of the $C_1$–$C_{10}$ alkyl, cyclic alkyl, substituted phenyl esters of acrylic, methacrylic acids and/or itaconate esters, and/or crosslinking agents, 0–20 parts by weight of wetting agents, 0 to 50 parts by weight of fluoroalkyl esters of acrylic, methacrylic acids and/or fluoroalkyl itaconate esters, 0–50 parts by weight of fluoro monomer having phenyl group.

Preferably, copolymers comprise 5 to 30 parts by weight of at least one multifunctional organosiloxane monomer copolymerized with 20 to 60 parts by weight of the monofunctional organosiloxane monomers, 5 to 40 parts by weight of the $C_1$–$C_{10}$ alkyl, cyclic alkyl and/or substituted phenyl esters of acrylic, methacrylic acids and/or itaconate esters, 2 to 8 parts by weight of the cross-linking agents, 5 to 10 parts by weight of wetting agents, 0 to 35 parts by weight of fluoroalkyl esters of acrylic, methacrylic acids and/or fluoroalkyl itaconate esters, 0 to 24 parts by weight of fluoromonomers having phenyl group.

The copolymers according to the present invention can be produced by a variety of methods, such as bulk polymerization, solution polymerization or possibly suspension polymerization in non-aqueous solution. Polymerization can be initiated by common initiators for free radical polymerization such as various peroxides, hydroperoxides, persulphates, substituted azo compounds or the like. Initiation can be carried out by ultraviolet light, or radiation if special initiators are used to form free radicals.

Representative free radical polymerization initiators include
dimethyl-2,2'-azobis iso-butylate,
2,2'-azobis(4-methoxy-2,4-dimethyl valeronitrile),
2,2'-azobis(2,4-dimethyl valeronitrile),
2,2'-azobis iso-butyronitrile,
1,1'-azobis(cyclohexane-1-carbonitrile),
benzoyl peroxide,
methyl ethyl ketone peroxide,
di-tert-butyl peroxide, isobutyl peroxide,
di-isopropyl peroxydicarbonate.

Generally, the free radical initiator such as the above is used in amounts of between about 0.05–5 parts by weight of the entire compound. The copolymerization of the comonomer mixture containing the free radical initiator is carried out at a temperature from 30° C. to 70° C. for a period of time from 4 to 80 hours, followed by a post cure at 90° C. to 110° C. for up to 5 hours to complete the polymerization.

The polymerization can be carried out directly a suitable mold to form contact lenses.

The following examples are presented to illustrate the practice of the invention and not as an indication of the limits of the scope thereof.

DESCRIPTION OF THE PREFERRED EMBODIMENTS OF INVENTION

The representative multifunctional organosiloxane monomers are synthesized as follows:

EXAMPLE 1

Synthesis of 1,5-bis(methacryloxypropyl)-1,1,3,3,5,5-hexamethyl trisiloxane (hereinafter referred to as BiMAPPS-1)

First, methacrylic acid was reacted with allyloxy ethanol in the presence of the catalyst of sulfuric acid by a usual esterification method to form allyloxyethyl methacrylate (boiling point=64° C.–65° C./2 mmHg, $n^{20}D=1.4463$, specific gravity $d^{20}4=0.982$).

About one mole of the above allyloxyethyl methacrylate and $1\times10^{-5}$ moles of platinum catalyst were placed in a 4 necked round bottom flask equipped with a reflux condenser, a thermometer, a stirring device and a dropping funnel. The mixture heated to about 50° C. and maintained at 50° C. for 15 minutes. The temperature of the reaction mixture was cooled down to 20° C. with a water bath. When the temperature had reached 20° C., 0.4 moles of 1,1,3,3,5,5-hexamethyl trisiloxane was added to the mixture with the temperature being held at 20° C. during 1,1,3,3,5,5-hexamethyl trisiloxane addition, and stirred for 24 hours. The reaction mixture was purified by distilling off all low boiling materials at 80° C. and 0.1 mmHg pressure. After the filtration with a membrane filter (0.2 μm), 1,5-bis(methacryloxyethoxypropyl)-1,1,3,3,5,5-hexamethyltrisiloxane represented by the following formula:

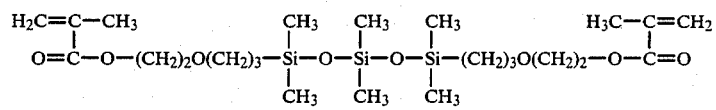

was obtained.

EXAMPLE 2

Synthesis of 1,3-bis(methacryloxyethoxypropyl)-1,1,3,3-tetramethyl disiloxane (hereinafter referred to as BiMAPPS-2)

When the procedure of Example 1 was repeated except that 1,1,3,3-tetramethyl disiloxane was substituted for the 1,1,3,3,5,5-hexamethyl trisiloxane of Ex. 1, 1,3-bis(methacryloxyethoxypropyl)-1,1,3,3-tetramethyl disiloxane represented by the following formula:

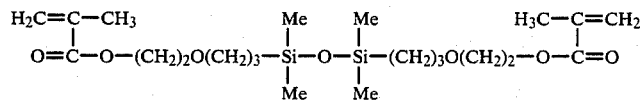

was obtained.

EXAMPLE 3

Synthesis of 1,3-bis(methacryloxyethoxypropyl)-1,1,3,3-tetrakis(bis(trimethylsiloxy)methylsiloxy)-disiloxane (hereinafter referred to as BiMAPPS-3)

First, allyloxyethyl methacrylate was synthesized in the same way as mentioned above.

The reaction vessel was a flask equipped with a stirring device, a thermometer, a dropping funnel and fitted with a reflux condenser and a drying tube. The flask was changed with about 1 mole of allyloxyethyl methacrylate and $1\times10^{-5}$ moles of a platinum catalyst. The mixture heated to about 50° C. for 15 minutes. The temperature of the reaction mixture was a water bath. When the temperature had reached 20° C., 1.1 moles of trimethoxysilane was added to the mixture with the temperature being held at 20° C. during trimethoxysilane addition, and stirred for 24 hours.

Fractionation of the resulting mixture gave methacryloxyethoxypropyl trimethoxysilane represented by the following formula:

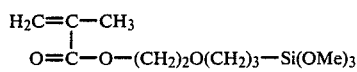

which has a vacuum boiling point of about 125° C. at 4 mmHg. Then, a flask equipped with a mechanical stirrer, a thermometer and a dropping funnel and fitted with a drying tube was prepared.

The flask was charged with one mole of methacryloxyethoxypropyl trimethoxysilane and two moles of 1,1,1,3,5,5,5-heptamethyl-3-acetoxy trisiloxane. The reaction mixture was cooled to less than 10° C. by an ice cooling bath. 50 ml of aqueous ethanoic sulfuric acid was added to the reaction mixture over a period of 90 minutes. Then, the temperature was slowly increased to room temperature and the reaction mixture was stirred for about 48 hours. The aqueous layer which separated was removed and discarded. The organic layer was washed with distilled water and thereafter with a dilute sodium bicarbonate solution, again with distilled water and then dried over sodium sulfate anhydrous. The dried reaction mixture was purified by distilling off all low boiling materials at 80° C. and 0.1 mmHg pressure. After the filtration with a membrane filter (0.2 μm), 1,3-bis(methacryloxyethoxypropyl)-1,1,3,3-tetrakis(-bis(trimethylsiloxy)methylsiloxy)disiloxane represented was obtained.

EXAMPLE 4

Synthesis of tris(methacryloxyethoxypropyl dimethylsiloxy)methylsilane (hereinafter referred to as Tri-MAPPS-1)

The reaction vessel was a flask equipped with a stirring device, a thermometer, a dropping funnel and fitted with a reflux condenser and a drying tube. The flask charged with about one mole of allyloxyethyl methacrylate and about $1\times10^{-5}$ moles of a platinum catalyst. The mixture heated to about 50° C. and maintained at 50° C. for 15 minutes. The temperature of the reaction mixture was cooled down to 20° C. with a water bath. When the temperature had reached 20° C., 1.1 moles of dimethylethoxysilane was added to the mixture with the temperature being held at 20° C. during dimethylethoxysilane addition, and stirred for 24 hours. Fractionation of the resulting gave methacryloxyethoxypropyl dimethyl ethoxysilane which had a vacuum boiling point of about 115° C. at 4 mm Hg.

Then, a flask equipped with a mechanical stirrer, a thermometer and a dropping funnel and fitted with a drying tube was prepared. The flask was charged with about three moles of methacryloxyethoxypropyl dimethyl ethoxysilane and one mole of methyl triacetoxysilane. The reaction mixture was cooled to less than 10° C. by an ice cooling bath. 50 ml of aqueous ethanoic sulfuric acid was added to the mixture over a period of 90 minutes. Then the temperature was slowly increased to room temperature and the reaction mixture was stirred for about 48 hours. The aqueous layer was removed and discarded. The organic layer was washed with distilled water and thereafter with a dilute sodium bicarbonate solution, again with distilled water and then dried over sodium sulfate anhydrous. The dried reaction mixture was purified by distilling off all low boiling materials at 80° C. and 0.1 mmHg pressure. After the filtration with a membrane filter (0.2 μm), tris(methacryloxyethoxypropyl dimethylsiloxy)methylsilane represented by the following formula:

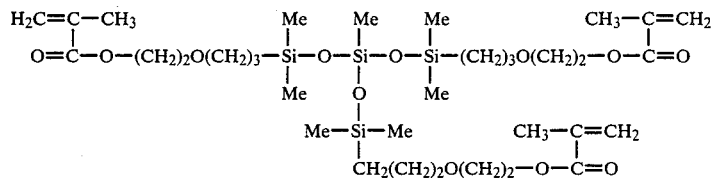
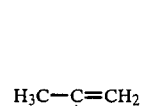

was obtained.

by the following formula:

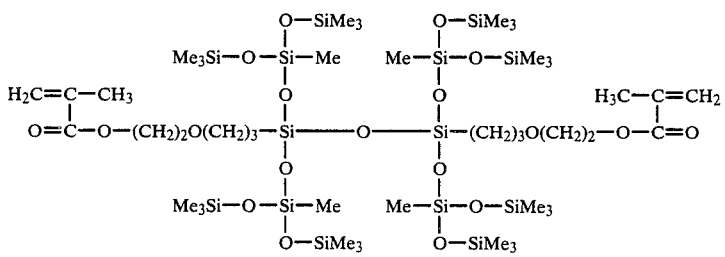

EXAMPLE 5

Synthesis of 1,3,5-tris(methacryloxyethoxypropyl)-1,3,5,7-tetramethyl-7-propylcyclotetrasiloxane (hereinafter referred to as TriMAPPS-2).

The reaction vessel was a flask equipped with a stirring device, a thermometer, a dropping funnel and fitted with a reflux condenser. The flask was charged with about one mole of allyloxyethyl methacrylate and $1 \times 10^{-5}$ moles of a platinum catalyst. The mixture heated to about 50° C. and maintained at 50° C. for 15 minutes. The temperature of the reaction mixture was cooled down to 20° C. with a water bath. When the temperature had reached 20° C., 0.33 moles of 1-propyl-1,3,5,7-tetramethylcyclotetrasiloxane was added to the mixture with the temperature being held at 20° C. during 1-propyl-1,3,5,7-tetramethylcyclotetrasiloxane addition, and stirred for 24 hours. The reaction mixture was purified by distilling off all low boiling materials at 80° C. and 0.1 mmHg pressure. After the filtration with a membrane filter (0.2 μm), 1,3,5-tris(methacryloxyethoxypropyl)-1,3,5,7-tetramethyl-7-propylcyclotetrasiloxane represented by the following formula:

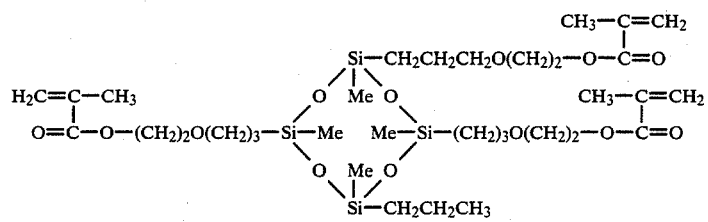

was obtained.

EXAMPLE 6

This example illustrates the preparation of a representative oxygen-permeable copolymer.

A mixture of 20 parts of multifunctional organosiloxane monomer (BiMAPPS-2) of Example 2, 45 parts of methacryloxypropyl-1,1,3,3,3-pentamethyldisiloxane (hereinafter referred to as MPS-1), 22 parts of methylmathacrylate (hereinafter referred to as MMA), 5 parts of triethylene glycol dimethacrylate (hereinafter referred to as TGD), 8 parts of methacrylic acid (hereinafter referred to as MA), 0.01 parts of blue oil dye (C.I. Solvent Green 3, C.I. 61565) and 0.01% by weight of entire mixture of 2,2'-azobis(2,4-dimethylvaleronitrile) (hereinafter referred to as V-65) was placed in Teflon-coated stainless steel tubes, each of which presents a cylindrical mold cavity of approximately 16 mm in diameter and 50 mm in length. The molds were covered and placed in a vacuum oven which had been purged with nitrogen. The oven was closed and the temperature was maintained at 40° C. for 20 hours to form polymer rods. Then the molds were heated at 90° C. for 10 hours, after which the solid rods were removed from the molds. The polymer rods were heated at the temperature of both 90° C. and 100° C. for 10 hours. The copolymer rods were bluish, hard, transparent and rigid.

Each rod was then machined to the desired diametric dimension, and thereafter sliced into a plurality of lens blanks.

The lens blanks were machined and finished in the usual manner to lenses.

The contact lenses thus obtained had the characteristics as shown in Table 1.

EXAMPLE 7

A mixture of 15 parts of multifunctional organosiloxane monomer (BiMAPPS-1) of Example 1, 35 parts of methacryloxypropyltris(trimethylsiloxy)silane (hereinafter referred to as MPS-2), 20 parts of MMA, 15 parts of dimethylitaconate (hereinafter referred to as DMI). 5 parts of tetraethylene glycol dimethacrylate (hereinafter referred to as 4ED), 5 parts of MA, 5 parts of N-vinyl-2-pyrrolidone (hereinafter referred to as N-VP), 0.01 parts of blue oil dye (C.I. Solvent Green 3, C.I. 61565) and 0.03% by weight of entire mixture of dimethyl-2,2'-azobis isobutylate (hereinafter referred to as V-601) was placed in some polypropylene molds. The molds were covered and placed in a vacuum oven which had been purged with argon.

The polymerization is carried out at 40° C. for 24 hours, at 60° C. for 10 hours, at 80° C. for 10 hours, at 90° C. for 5 hours, after which the solid blanks were removed from the molds. The polymer blanks were heated at the temperature of both 100° C. and 110° C. for 10 hours. Lenses prepared from the blanks were hard, rigid, transparent and had the characteristics as shown in Table 1.

EXAMPLE 8

A mixture of 8 parts of BiMAPPS-1, 35 parts of MPS-2, 39 parts of MMA, 2 parts of TGD, 8 parts of ethylene glycol dimethacrylate (hereinafter referred to as EDMA), 8 parts of MA, 0.01 parts of blue oil dye (C.I. Solvent Green 3, C.I. 61565) and 0.01% by weight of entire mixture of V-65 is placed in a Teflon-coated aluminum tubes, each of which presents a cylindrical mold cavity of approximately 16 mm in diameter and 50 mm in length. The polymerization is carried out under the conditions described in Example 7.

The contact lenses thus obtained had the characteristics as shown in Table 1.

TABLE 1

| Properties of Example 6 to 8 | | | |
|---|---|---|---|
| Example | 6 | 7 | 8 |
| Color of Polymer | blue | blue | blue |
| Shore Hardness scale D | 83.1 | 82.6 | 84.7 |
| Wetting Angle (degree) | 72.4 | 74.0 | 71.8 |
| Oxygen permeability* | 17.3 | 18.5 | 15.7 |
| Solvent Resistance | | | |

TABLE 1-continued

| Properties of Example 6 to 8 | | | |
|---|---|---|---|
| Example | 6 | 7 | 8 |
| Change in color after soaking in n-hexane for 30 hours | non | non | non |
| n-hexane content** after soaking in n-hexane for 30 hours (wt %) | 6.1 | 5.4 | 7.0 |

*$(cm^2/sec)(ml\ O_2/ml \times mmHg) \times 10^{-11}$
**The following equation was used for the calculation of the n-hexane content;
$HC_{30} = (W_h - W_1)/W_1 \times 100\ (\%)$
$HC_{30}$ = n-hexane content after soaking in n-hexane for 30 hrs
$W_1$ = weight of the lens
$W_h$ = weight of the lens after soaking in n-hexane for 30 hrs.
Note:
It is desirable that n-hexane content is less than 7.0 wt % and the lens is not discolored.

COMPARATIVE EXAMPLE 1

The procedures of Example 1 were repeated except that 65 parts of MPS-1 was substituted for 20 parts of BiMAPPS-2 and 45 parts of MPS-1 of Example 6.

The properties of lenses prepared from this copolymer is shown in the Table 2.

COMPARATIVE EXAMPLE 2

The procedures of Example 2 were repeated except that 50 parts of MPS-2 was substituted for 15 parts of BiMAPPS-1 and 35 parts of MPS-2 of Example 7.

The properties of lenses prepared from this copolymer is shown in the Table 2.

COMPARATIVE EXAMPLE 3

A mixture of 40 parts of MPS-2, 26 parts of MMA, 20 parts of DMI, 6 parts of TGD, 8 parts of MA, 0.01 parts of blue oil dye (C.I. Solvent Green 3, C.I. 61565) and 0.01% by weight of entire mixture of V-65 is placed in a Teflon-coated aluminum tubes.

The polymerization is carried out under the conditions described in Example 8.

The contact lenses thus obtained had the characteristics as shown in the Table 2.

TABLE 2

| Properties of Comparative Example 1 to 3 | | | |
|---|---|---|---|
| Comparative Example | 1 | 2 | 3 |
| Color of Polymer | blue | blue | blue |
| Shore Hardness scale D | 79.3 | 81.5 | 83.3 |
| Wetting Angle (degree) | 75.1 | 77.8 | 71.8 |
| Oxygen permeability* | 17.5 | 19.0 | 14.7 |
| Solvent Resistance | | | |
| Change in color after soaking in n-hexane for 30 hours | discolored | discolored | discolored |
| n-hexane content** after soaking in n-hexane for 30 hours (wt %) | 12.1 | 9.1 | 10.3 |

*$(cm^2/sec)(ml\ O_2/ml \times mmHg) \times 10^{-11}$
**The following equation was used for the calculation of the n-hexane content;
$HC_{30} = (W_h - W_1)/W_1 \times 100\ (\%)$
$HC_{30}$ = n-hexane content after soaking in n-hexane for 30 hrs
$W_1$ = weight of the lens
$W_h$ = weight of the lens after soaking in n-hexane for 30 hrs.
Note:
It is desirable that n-hexane content is less than 7.0 wt % and the lens is not discolored.

EXAMPLE 9–35

These examples illustrate the preparation of copolymers formed by free radical copolymerization of various proportions of monomers as shown in Table 3.

The properties of lenses prepared from the copolymers are shown in the Table 3, and Table 4.

TABLE 3

| Example | Multifunctional Organosiloxane Monomers | | Monofunctional Organosiloxane Monomers | | Comonomers | | Cross-linking Agents | | Wetting Agents | | Free Radical Initiators | | Shore* Hardness | Wetting Angle** | Oxygen*** Permeability |
|---|---|---|---|---|---|---|---|---|---|---|---|---|---|---|---|
| 10 | BiMAPPS-1 | 10 | MPS-1 | 35 | MMA | 39 | EDMA | 8 | MA | 8 | V-65 | 0.01 | 85.0 | 71.8 | 13.3 |
| 11 | BiMAPPS-1 | 20 | MPS-1 | 35 | MMA | 18 | EDMA | 8 | MA | 9 | BZPO | 0.01 | 84.8 | 76.7 | 16.0 |
|  |  |  |  |  | FM-1 | 10 |  |  |  |  |  |  |  |  |  |
| 12 | BiMAPPS-1 | 5 | MPS-2 | 45 | MMA | 34 | EDMA | 8 | MA | 8 | BZPO | 0.01 | 81.0 | 77.0 | 25.3 |
| 13 | BiMAPPS-1 | 5 | MPS-2 | 45 | EMA | 34 | EDMA | 8 | MA | 8 | V-65 | 0.01 | 80.2 | 77.2 | 26.2 |
| 14 | BiMAPPS-1 | 10 | MPS-2 | 45 | CHMA | 29 | EDMA | 8 | MA | 8 | V-65 | 0.01 | 80.3 | 77.9 | 27.4 |
| 15 | BiMAPPS-1 | 20 | MPS-2 | 45 | 2EHMA | 19 | TGD | 8 | MA | 8 | V-65 | 0.01 | 80.1 | 77.2 | 28.1 |
| 16 | BiMAPPS-1 | 5 | MPS-2 | 55 | MMA | 18 | TGD | 3 | MA | 8 | V-65 | 0.01 | 78.0 | 79.3 | 31.5 |
|  |  |  |  |  | M-A | 6 | TGD-A | 3 | 2HEMA | 2 |  |  |  |  |  |
| 17 | BiMAPPS-1 | 10 | MPS-2 | 60 | MMA | 10 | EDMA | 3 | MA | 5 | V-65 | 0.01 | 76.2 | 82.7 | 37.3 |
|  |  |  |  |  | CHMA | 4 | TGD | 3 | 2HPMA | 5 |  |  |  |  |  |
| 18 | BiMAPPS-2 | 20 | MPS-2 | 35 | MMA | 17 | EDMA | 5 | MA | 8 | V-65 | 0.01 | 83.9 | 72.0 | 19.2 |
|  |  |  |  |  | i-BMA | 10 | TGD | 5 |  |  |  |  |  |  |  |
| 19 | BiMAPPS-2 | 20 | MPS-2 | 35 | MMA | 20 | EDMA | 7 | MA | 6 | V-65 | 0.01 | 84.2 | 71.8 | 18.2 |
|  |  |  |  |  | DMI | 8 | 4ED | 2 | N-VP | 2 |  |  |  |  |  |
| 20 | BiMAPPS-2 | 30 | MPS-2 | 25 | MMA | 20 | EDMA | 7 | MA | 8 | V-65 | 0.01 | 84.4 | 73.8 | 18.3 |
|  |  |  |  |  | MEI | 8 | 4ED | 2 |  |  |  |  |  |  |  |
| 21 | BiMAPPS-2 | 10 | MPS-2 | 30 | MMA | 31 | EDMA | 7 | MA | 10 | V-65 | 0.01 | 84.2 | 75.2 | 16.8 |
|  |  |  |  |  | FM-1 | 10 | TMP | 2 |  |  |  |  |  |  |  |
| 22 | BiMAPPS-2 | 10 | MPS-2 | 30 | MMA | 26 | TMP | 7 | MA | 7 | V-65 | 0.01 | 83.2 | 77.4 | 17.7 |
|  |  |  |  |  | FDI-1 | 20 |  |  |  |  |  |  |  |  |  |

*Shore hardness scale D
**degree
***$(cm^2/sec)(ml\ O_2/ml \times mmHg) \times 10^{-11}$

TABLE 4

| Example | Multifunctional Organosiloxane MOnomers | | Monofunctional Organosiloxane Monomers | | Comonomers | | Cross-linking Agents | | Wetting Agents | | Free Radical Initiators | | Shore* Hardness | Wetting Angle** | Oxygen*** Permeability |
|---|---|---|---|---|---|---|---|---|---|---|---|---|---|---|---|
| 23 | BiMAPPS-2 | 30 | MPS-2 | 20 | MMA<br>CHMA<br>FM-2 | 19<br>8<br>10 | PETMA | 5 | MA | 8 | V-65 | 0.01 | 85.1 | 76.5 | 16.9 |
| 24 | BiMAPPS-3 | 5 | MPS-2 | 40 | MMA | 40 | TGD<br>1,4-BOMA | 5<br>3 | MA | 7 | V-65 | 0.01 | 79.1 | 78.2 | 28.3 |
| 25 | BiMAPPS-4 | 20 | MPS-3 | 40 | MMA<br>M-A<br>FA-1 | 2<br>8<br>10 | ED-A<br>TGD-A | 5<br>5 | MA<br>AA | 5<br>5 | V-65 | 0.01 | 82.3 | 74.8 | 23.4 |
| 26 | TriMAPPS-1 | 10 | MPS-2 | 45 | MMA | 31 | EDMA | 7 | MA | 7 | V-65 | 0.01 | 81.2 | 76.7 | 25.3 |
| 27 | TriMAPPS-2 | 15 | MPS-3 | 40 | MMA | 31 | EDMA | 7 | MA | 7 | V-65 | 0.01 | 80.1 | 79.3 | 28.3 |
| 28 | TriMAPPS-2 | 15 | MPS-6 | 24 | MMA<br>FM-1 | 10<br>35 | EDMA | 7 | MA | 9 | V-65 | 0.01 | 79.6 | 80.0 | 30.2 |
| 29 | BiMAPPS-2 | 25 | MPS-5<br>MPS-6 | 10<br>20 | MMA<br>i-BMA | 14<br>8 | EDMA<br>TGD | 7<br>8 | MA<br>N-VP | 4<br>4 | V-65 | 0.01 | 82.9 | 74.7 | 21.3 |
| 30 | BiMAPPS-2 | 8 | MPS-2<br>MPS-4 | 40<br>5 | MMA | 30 | EDMA<br>TGD | 8<br>2 | MA | 7 | V-65 | 0.01 | 83.1 | 72.3 | 21.1 |
| 31 | BiMAPPS-1<br>BiMAPPS-2 | 5<br>5 | MPS-2 | 48 | PMA | 25 | EDMA<br>TGD | 8<br>2 | MA | 7 | V-65 | 0.01 | 81.3 | 74.8 | 27.3 |
| 32 | BiMAPPS-2<br>TriMAPPS-2 | 5<br>8 | MPS-2 | 35 | MMA<br>CHMA | 8<br>5 | EDMA<br>4ED | 8<br>6 | MA<br>AA | 6<br>4 | V-65 | 0.01 | 83.7 | 73.1 | 20.3 |
| 33 | BiMAPPS-1 | 5 | MPS-2 | 48 | MMA<br>FBM | 5<br>24 | EDMA<br>TGD | 8<br>2 | MA | 8 | V-601 | 1.00 | 87.1 | 72.5 | 27.8 |
| 34 | BiMAPPS-1 | 5 | MPS-2 | 48 | MMA<br>FCM | 5<br>24 | EDMA<br>TGD | 8<br>2 | MA | 8 | V-601 | 1.00 | 87.5 | 73.4 | 27.5 |
| 35 | BIMAPPS-1 | 5 | MPS-2 | 48 | MMA<br>BMFB<br>FM-1 | 10<br>10<br>14 | TGD | 5 | MA | 8 | V-601 | 1.00 | 88.3 | 73.7 | 27.1 |

*Shore hardness scale D
**degree
***$(cm^2/sec)(ml\ O_2/ml \times mmHg) \times 10^{-11}$ Note:
BiMAPPS-4: 1,5-bis(acryloxyethoxypropyl)-1,1,3,3,5,5-hexamethyltrisiloxane
MPS-3: acryloxypropyl tris(trimethylsiloxy)silane
MPS-4: methacryloxypropyl-1,1-diethyl-3,3,3-tetramethyldisiloxane
MPS-5: methacryloxypropyl-3-isobutyl-1,1,3,3-tetramethyldisiloxane
MPS-6: methacryloxypropyl-1,3,5,7-tetrammethyl-3,5,7-tripropylcyclotetrasiloxane
EMA: ethyl methacrylate
2EHMA: 2-ethylhexyl methacrylate
M-A: methyl acrylate
i-BMA: isobutyl methacrylate
MEI: monoethyl itaconate
PMA: propyl methacrylate
FM-1: 2,2,2-trifluoroethyl mathacrylate
FDI-1: bis(2,2,2-trifluoroethyl)itaconate
FM-2: 2,2,3,3-tetrafluoropropyl methacrylate
FA-1: 2,2,2-trifluoroethyl acrylate
TGD-A: triethylene glycol diacrylate
TMP: trimethylolpropane trimethacrylate
PETMA: pentaerythrytol tetramethacrylate
1,4-BOMA: 1,4-butanediol tetramethacrylate
ED-A: ethylene glycol diacrylate
2HEMA: 2-hydroxyethyl methacrylate
2HPMA: 2-hydroxypropyl methacrylate
AA: acrylic acid
BZPO: benzoyl peroxide
FBM: p-trifluoromethylbenzyl methacrylate
FCM: 2,2,2,2',2'-hexafluoro cumyl methacrylate
BMFB: 1,3-bis(2-methacryloxy hexafluoro isopropyl)benzene

We claim:

1. An oxygen-permeable, solvent-resistant, dimensionally stable, hard contact lens material consisting essentially of a copolymer formed by free radical polymerization of (a) at least one multifunctional organosiloxane monomer represented by the formulas:

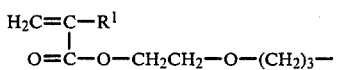

and

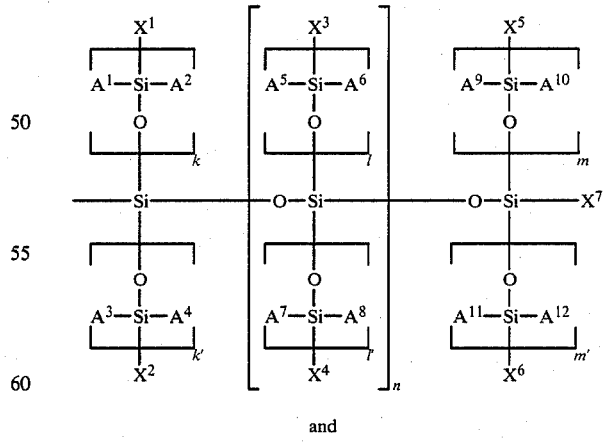

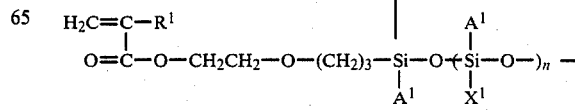

wherein "$X^1$"–"$X^7$" are selected from the class consisting of $C_1$–$C_6$ alkyl groups, cyclic alkyl groups, phenyl groups and "Y" groups, at least one of "$X^1$"–"$X^7$" being "Y" group; "Y" is a group of the following structure:

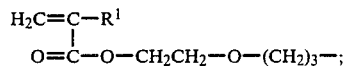

"$R^1$" is hydrogen or methyl radical; "$A^1$"–"$A^{12}$" are selected from the class consisting of $C_1$–$C_6$ alkyl groups, cyclic alkyl groups, phenyl groups and "Z" groups; "Z" is a group of the following structure:

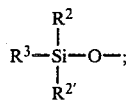

"$R^2$", "$R^{2'}$" and "$R^3$" are selected from the class consisting of $C_1$–$C_6$ alkyl groups, cyclic alkyl groups and phenyl groups; "k", "k'", "l", "l'", "m", "m'" and n are integers from 0 to 10; and mixture thereof, (b) at least one monofunctional organosiloxane monomer represented by the formulas:

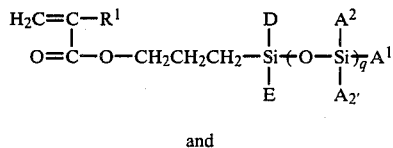

and

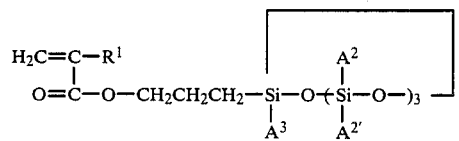

wherein "$R^1$" is hydrogen or methyl radical; "$A^1$", "$A^2$", "$A^{2'}$" and "$A^3$" are selected from the class consisting of $C_1$–$C_6$ alkyl groups and phenyl groups; "D" and "E" are selected from the class consisting of $C_1$–$C_6$ alkyl groups, phenyl groups and the following groups:

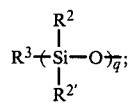

"$R^2$", "$R^{2'}$" and "$R^3$" are selected from the class consisting of $C_1$–$C_6$ alkyl groups and phenyl groups; "q" is an integer from 1 to 3; and mixture thereof, (c) at least one comonomer selected from the class consisting of $C_1$–$C_{10}$ alkyl, cyclic alkyl or substituted phenyl esters of acrylic, methacrylic acids and itaconate esters and cross-linking agents.

2. The oxygen-permeable hard contact lens material according to claim 1, wherein said cross-linking agents include multifunctional compounds such as:
ethylene glycol diacrylate and dimethacrylate,
diethylene glycol diacrylate and dimethacrylate,
triethylene glycol diacrylate and dimethacrylate,
tetraethylene glycol diacrylate and dimethacrylate,
1,3-butanediol diacrylate and dimethacrylate,
1,4-butanediol diacrylate and dimethacrylate,
1,6-hexanediol diacrylate and dimethacrylate,
neopentyl glycol diacrylate and dimethacrylate,
trimethylol propane triacrylate and trimethacrylate,
pentaerythrytol tetraacrylate and tetramethacrylate,
diacryloxybenzophenone and dimethacryloxybenzophenone,
diacryloxy dimethoxy benzophenone and dimethacryloxy dimethoxy benzophenone.

3. The oxygen-permeable hard contact lens material according to claim 1, wherein said copolymer is formed by free radical polymerization of 2 to 80 parts by weight of said multifunctional organosiloxane monomer 5 to 60 parts by weight of said monofunctional organosiloxane monomer and 0.5 to 95 parts by weight of said $C_1$–$C_{10}$ alkyl, cyclic alkyl, substituted phenyl esters and/or cross-linking agents.

4. The oxygen-permeable hard contact lens material according to claim 3, wherein said copolymer further includes at least one wetting agent selected from the class consisting of
2-hydroxy ethyl acrylate and methacrylate,
2-hydroxy propyl acrylate and methacrylate,
2-hydroxy butyl acrylate and methacrylate,
diethylene glycol monoacrylate and monomethacrylate,
triethylene glycol monoacrylate and monomethacrylate,
acrylic acid, methacrylic acid, acrylamide, methacrylamide,
N-methylol methacrylamide, N-vinyl-2-pyrrolidone.

5. The oxygen-permeable hard contact lens material according to claim 4, wherein said copolymer includes 1 to 20% by weight of entire mixture of said wetting agents.

6. The oxygen-permeable hard contact lens material according to claim 5, wherein said copolymer further includes at least one fluoroalkyl ester monomer represented by the formulas:

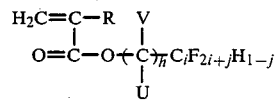

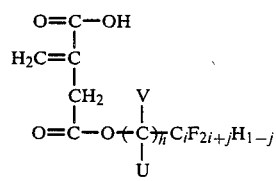

and

-continued

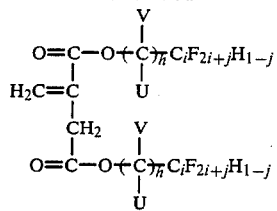

wherein "U" and "V" are selected from the class consisting of hydrogen and trifluoromethyl radical; "R" is hydrogen or methyl radical; "h" is 1 or 2; "i" is an integer from 1 to 10; "j" is 0 or 1.

7. The oxygen-permeable hard contact lens material according to claim 6, wherein said copolymer include 5 to 50% by weight of said fluoroalkyl ester monomer.

8. The oxygen-permeable hard contact lens material according to claim 5, wherein said copolymer further includes at least one fluoro monomer having phenyl group from the class consisting of
o-trifluoromethyl benzyl acrylate and methacrylate,
bis(o-trifluoromethyl benzyl)itaconate,
p-trifluoromethyl benzyl acrylate and methacrylate,
bis(p-trifluoromethyl benzyl)itaconate,
2,2,2,2',2',2'-hexafluoro cumyl acrylate and methacrylate,
bis(2,2,2,2',2',2'-hexafluoro cumyl)itaconate,
1,3-bis(2-acryloxy hexafluoro isopropyl)benzene,
1,3-bis(2-methacryloxy hexafluoro isopropyl)benzene.

9. The oxygen-permeable hard contact lens material according to claim 8, wherein said copolymer include 2–50% by weight of entire mixture of said oxygen-permeable rigid modifier.

* * * * *